United States Patent [19]
Notter et al.

[11] Patent Number: 5,195,404
[45] Date of Patent: Mar. 23, 1993

[54] DRILL BIT WITH CUTTING INSERT

[76] Inventors: Theo A. Notter, 29 Langley Drive, Camberley, Surrey, GU15 3TB, England; David W. James, 68 Derby Square, Douglas, Isle of Man

[21] Appl. No.: 758,162

[22] Filed: Sep. 11, 1991

Related U.S. Application Data

[63] Continuation of Ser. No. 209,223, Jun. 20, 1988, abandoned.

[30] Foreign Application Priority Data

Jun. 18, 1987 [GB] United Kingdom ............... 8714340

[51] Int. Cl.$^5$ ............................................. B23P 15/32
[52] U.S. Cl. .................................. 76/108.6; 76/101.1; 407/118; 408/144; 408/145
[58] Field of Search ............... 408/144, 145; 76/108.6, 76/112, 108.1, 101.1; 407/32, 118; 175/409–411

[56] References Cited

U.S. PATENT DOCUMENTS

| | | | |
|---|---|---|---|
| 1,977,845 | 10/1934 | Emmons | 408/144 |
| 4,109,737 | 8/1978 | Bovenkerk | 407/51 |
| 4,252,102 | 2/1981 | Phaal et al. | 76/101 A |
| 4,481,016 | 11/1984 | Campbell et al. | 51/295 |
| 4,527,643 | 7/1985 | Horton et al. | 408/144 |
| 4,604,106 | 8/1986 | Hall et al. | 51/293 |
| 4,671,710 | 6/1987 | Aoki | 408/145 |
| 4,714,385 | 12/1987 | Komanduri | 407/119 |
| 4,849,602 | 7/1989 | Gardner | 76/101.1 |

FOREIGN PATENT DOCUMENTS 2503739  7/1975  Fed. Rep. of Germany ..... 76/101.1

OTHER PUBLICATIONS

New Thoughts on Machinery for Synthetic Polycrystalline Diamond Die Piercing and Profiling.
Machining of Diamonds by High Energy-Density Sources, by C. van Osenbruggen and T. Botden.
High Speed Spark Machining, Dyne, Apr. 1984.
Spark Erosion of Diamond, *The Review of Scientific Instruments*.

Primary Examiner—Daniel W. Howell
Attorney, Agent, or Firm—Scully, Scott, Murphy & Presser

[57] ABSTRACT

The invention provides a method of manufacturing a twist drill having a cutting insert. The method includes the steps of providing a cutting insert which has a prismatic shape and which comprises a layer of abrasive compact which is bonded to a cemented carbide backing. The insert has on a first facet a cutting edge formed by the abrasive compact layer, and on a second facet a seating surface formed predominantly by the cemented carbide backing. The first and second facets define a predetermined first angle with each other. A twist drill is provided, having a seat in its flank. The seat defines a support surface adapted to receive a seating surface of the insert, and is inclined at a predetermined second angle to the face of the drill. The insert is bonded into the seat, so that the cutting edge of the insert defines the major cutting edge of the drill and the first facet of the insert coincides with the face of the drill. The invention includes cutting inserts and twist drills produced by the method.

11 Claims, 3 Drawing Sheets

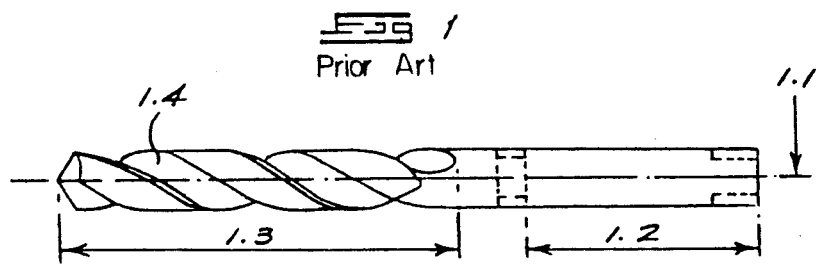
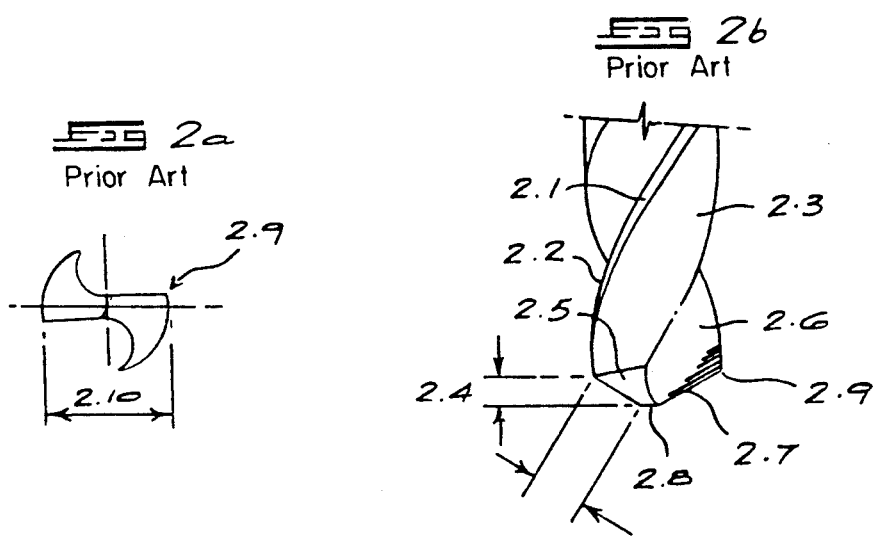
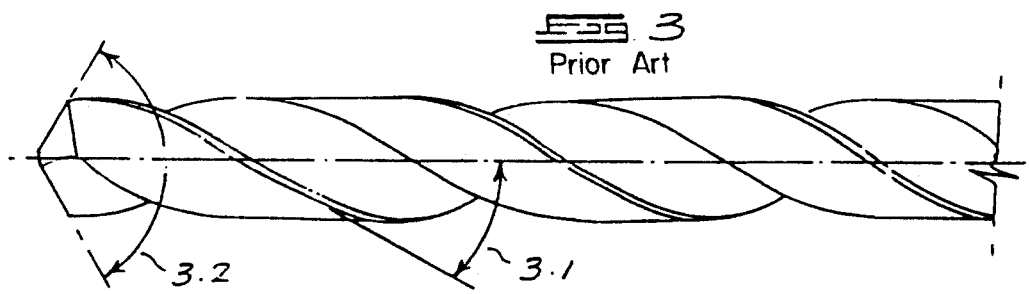
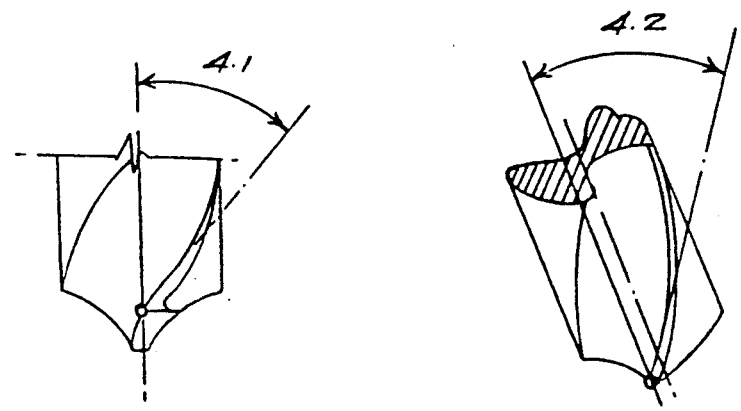

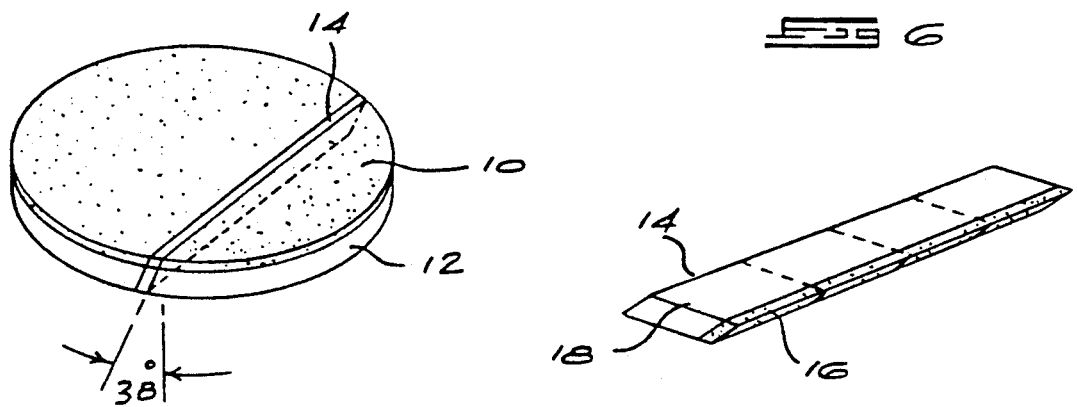
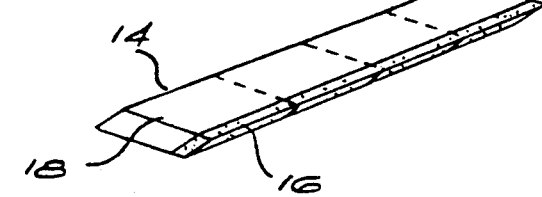
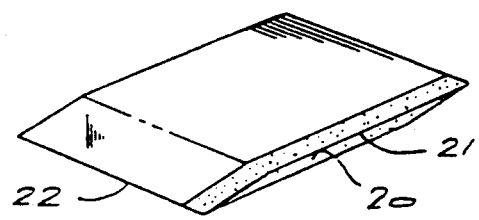
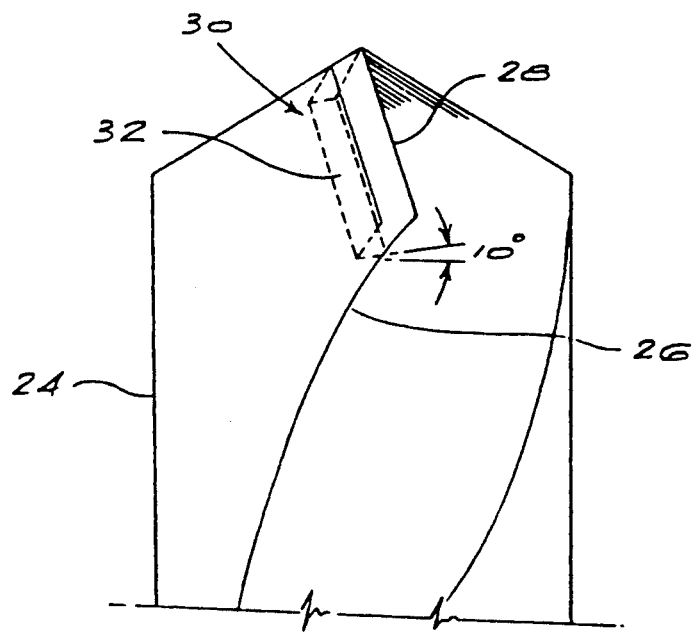

DRILL BIT WITH CUTTING INSERT

This application is a continuation of application Ser. No. 209,223, filed on June 20, 1988, now abandoned.

BACKGROUND OF THE INVENTION

This invention relates to a twist drill which has a cutting insert bonded into a seat in the drill.

The life of a twist drill can be extended if it is provided with cutting inserts of very hard or abrasive material. It is known to provide a slot in the cutting end of the drill, into which a cutting insert is located and bonded by brazing. The cutting edge or surface of such inserts may be made of diamond abrasive compact.

Because cutting inserts of this kind are very hard, it is usually very difficult to reshape the flute geometry of the twist drill after the insert has been brazed into place. It would be desirable to minimise the amount of machining required to obtain the desired cutting edge and flute geometry after the insert has been fixed to the twist drill.

SUMMARY OF THE INVENTION

According to the invention there is provided a method of manufacturing a twist drill having a cutting insert including the steps of providing a cutting insert which has a prismatic shape and which comprises a layer of abrasive compact which is bonded to a cemented carbide backing, the insert having on a first facet thereof a cutting edge formed by the abrasive compact layer, and on a second facet thereof a seating surface formed predominantly by the cemented carbide backing, the first and second facets defining a predetermined first angle with each other; providing a twist drill having a seat in the flank thereof, the seat defining a support surface adapted to receive the seating surface of the insert, the support surface being inclined at a predetermined second angle to the face of the drill; and bonding the insert into the seat, so that the cutting edge of the insert defines the major cutting edge of the drill and the first facet of the insert coincides with the face of the drill.

Preferably the cutting insert is obtained by cutting an elongate strip from a larger composite abrasive compact body, and cutting the strip into a plurality of cutting inserts.

The composite abrasive compact body may comprise a layer of abrasive compact bonded to a cemented carbide backing layer, the body having at least one flat surface and the strip being cut along parallel planes which are inclined at a predetermined angle to an imaginary plane normal to the flat surface.

In one embodiment the cutting inserts cut from the strip have a seating surface which is rectangular.

In another embodiment the cutting inserts cut from the strip have a seating surface which is triangular.

In this specification, a number of terms are used which have a relatively narrow meaning in relation to twist drills. These terms are defined below, with reference to FIGS. 1 to 4 of the accompanying drawings.

In FIG. 1:

Axis:
The longitudinal centre-line of the drill.

Shank:
That portion of the drill by which it is held and driven.

Body:
That portion of the drill extending from the shank to the chisel edge 2.8.

Flute:
A groove in the body of the drill which, at the intersection with the flank 2.5 provides a major cutting edge 2.7, thus permitting removal of chips and allowing cutting fluid to reach the major cutting edge.

In FIG. 2:

Land:
The cylindrical or conical leading surface of the drill.

Leading edge of a land (minor cutting edge):
The edge formed by the intersection of a land 2.1 and a flute 1.4.

Body clearance:
The portion of a fluted land reduced in diameter to provide diametral clearance.

Point (cutting part):
The functional part of the drill composed of chip producing elements. The major cutting edges (lips) 2.7, chisel edge 2.8, faces 2.6 and flanks 2.5 are therefore elements of the point or cutting part.

Flank (major flank):
The surface on the drill point bounded by the major cutting edge 2.7, the fluted land 2.1, the following flute and the chisel edge 2.8.

Face:
The portion of the surface of a flute adjacent to the major cutting edge 2.7 and on which the chip impinges as it is cut from the workpiece.

Major cutting edge (lip):
The edge formed by the intersection of a flank 2.5 and face 2.6.

Chisel edge:
The edge formed by the intersection of the flanks 2.5.

Outer corner
The corner formed by the intersection of a major cutting edge 2.7 and the leading edge of the land 2.1.

Drill Diameter:
The measurement across the lands 2.1 at the outer corners 2.9 of the drill measured immediately adjacent to the point 2.4.

In FIG. 3:
Helix angle: The acute angle between the tangent to the helical leading edge and a plane containing the axis and the point in question. This angle lies in a plane normal to the radius at the point on the edge.
Point angle: Twice the angle formed by the drill axis and the projection of a major cutting edge in a plane through the drill axis and parallel to this cutting edge.

In FIG. 4:
Side rake:
The angle between a face 2.6 and a plane passing through the selected point on the cutting edge and the drill axis, measured in the plane perpendicular to the radius at the selected point. (When the selected point is the outer corner, this angle is equivalent to the helix angle.)

Normal rake:
The angle between a face 2.6 and a plane passing through the selected point on the cutting edge and the drill axis, measured in the plane perpendicular to the cutting edge.

BRIEF DESCRIPTION OF THE DRAWINGS

FIGS. 1, 2a, 2b, 3, 4a and 4b illustrate a conventional twist drill;
FIGS. 5 to 8 illustrate a first embodiment of the invention in which a polycrystalline diamond cutting insert is provided in a seat at the point of a twist drill.

DESCRIPTION OF EMBODIMENTS

Figure 9:
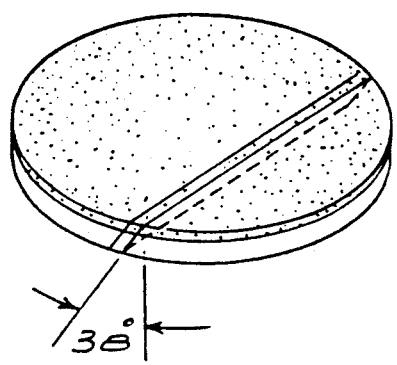
FIGS. 9 to 12 illustrate a second embodiment of the invention.
Figure 10:
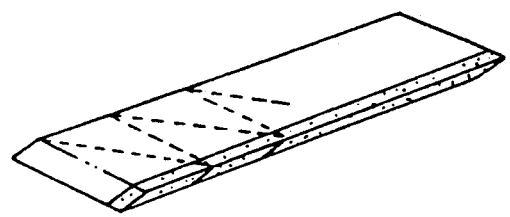

FIG. 5 shows a composite diamond abrasive compact, such as SYNDITE PCD, which is disc shaped and which comprises a PCD layer 10 and an integral tungsten carbide support layer 12. The layer 10 is approximately 0.5–0.7 mm thick, while the layer 12 is several millimetres thick. The compact has flat faces which lie in parallel planes. An elongate strip 14 is cut from the disc along parallel planes which are inclined at an angle of 38° to an imaginary plane normal to the upper surface of the disc. The resulting strip 14 has a PCD layer 16 which has a flat, elongate upper surface, and an integral tungsten carbide backing layer 18 which is considerably thicker than the PCD layer 16.

The strip 14 is cut along the dotted lines in FIG. 6 to produce a number of prismatic cutting inserts, one of which is illustrated in FIG. 7. The insert has a first facet defining a cutting surface 20 of PCD material, and a second facet defining a rectangular seating surface 22 predominantly of tungsten carbide. The first and second facets are inclined, in this case, at 142° to one another (ie. 180°-38°). One edge 21 of the cutting surface 20 will eventually define the major cutting edge of the finished drill.

Referring now to FIG. 8, a standard twist drill 24 has a pair of faces 26 and a pair of major cutting edges (lips) 28 which are symmetrical with respect to the drill axis. Adjacent and parallel to each major cutting edge 28, a radially extending slot 30 of uniform width is cut to define a generally rectangular support surface 32. One side of the slot 30 coincides with the major cutting edge of the drill. The support surface 32 is inclined at 10° to the perpendicular of a plane formed by the major cutting edge and the face.

The angle at which the strip 14 is cut is determined in such a way that when the cutting inserts are brazed into seats provided in the twist drill point, the two inserts on each of the flanks meet up at the drill axis to form the chisel edge of the drill.

The slot 30 and the cutting insert shown in FIG. 7 have complementary shapes, so that when the cutting insert is fitted into the slot and brazed into place, its cutting surface 20 is flush with the face of the drill, and the cutting edge 21 forms the major cutting edge of the finished drill. In the illustrated example, the helix angle of the drill is 28° and the associated side rake and normal rake angles (which vary from point to point along the cutting edge) are of similar magnitude. By inclining the support surface 32 relative to the face of the drill and providing a cutting insert which has a cutting surface 20 which is inclined relative to its seating surface 22 as described, the cutting surface of the completed drill is aligned with the face and is tangential therewith, and the face geometry is maintained.

Figure 11:
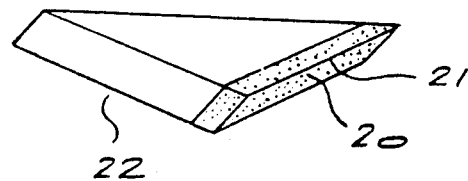
Figure 12:
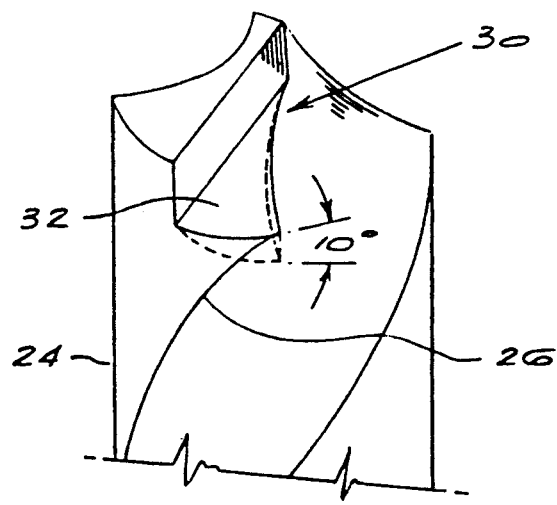

The embodiment illustrated in FIGS. 9 to 12 is similar to that described above, with the major difference that the cutting insert illustrated in FIG. 11 is cut triangularly. The slot 30 adjacent the major cutting edge of the twist drill 24 (see FIG. 12) defines a complementary triangular seating surface which, again, is inclined at 10° relative to a plane which is normal to a plane formed by the major cutting edge and the face.

In both the described embodiments, the forces applied to the cutting inserts in use are compressive forces with respect to the cutting surfaces 20, and shear forces with respect to the seating surfaces 22. This is advantages since the polycrystalline diamond (PCD) layer of the cutting insert is most resistant to compressive stresses, while the brazed interface between the seating surface 22 and the support surface is more resistant to shear stresses than tensile stresses. The embodiment illustrated in FIGS. 9 to 12 has the additional advantage that the area of the bond between the seating surface 22 and the support surface 32 is relatively large.

Further advantages of the described embodiments include the fact that a very small amount of material is used to form the cutting inserts and that very little subsequent grinding or electric discharge machining is required after the inserts have been brazed into place.

We claim:

1. A method of manufacturing a twist drill, comprising the steps of:

forming at lest one cutting insert comprising an abrasive compact bonded to a cemented carbide backing, and having a prismatic shape including first and second adjacent facets forming a predetermined first angle with each other, the forming step including the steps of (i) forming the first facet with a cutting edge comprised of the abrasive compact, (ii) forming the second facet with a seating surface comprised predominantly of the cemented carbide backing, (iii) cutting an elongate strip from a larger composite abrasive compact body, and (iv) cutting the strip into a plurality of cutting inserts;

providing a drill body including at least one flank located at a front end of the drill body and at least one face extending rearward from the flank;

forming at least one seat in the flank of the drill body, and defining a support surface to support the seating surface of the insert and inclined at a predetermined second angle to the face of the drill body; and bonding the cutting insert in the seat of the drill body, so that the cutting edge of the insert defines a major cutting edge of the twist drill and the first facet of the insert coincides with the face of the twist drill.

2. A method according to claim 1, wherein:

the composite abrasive compact body includes a layer of said abrasive compact bonded to a layer of said cemented carbide backing, and the compact body further includes at least one flat surface; and the step of cutting the elongate strip from the composite abrasive compact body includes the step of cutting said body along parallel planes that are inclined at a predetermined angle to an imaginary plane normal to said flat surface.

3. A method according to claim 2, wherein the step of cutting the strip onto a plurality of cutting inserts includes the steps of forming each insert with a prismatic shape having first and second adjacent facets, and forming the second facet of each insert with a seating surface having a rectangular shape.

4. A method according to claim 1, wherein:

the step of forming at least one seat in the flank of the drill body includes the step of cutting the seat in the flank of the drill body in the form of a slot having a uniform width;

the supporting surface of the seat has a generally rectangular shape; and the slot includes one side coinciding with the major cutting edge of the drill.

5. A method of according to claim 1, wherein:

the drill body comprises first and second flanks and first and second faces;

the step of forming at least one seat includes the steps of cutting a first slot in the flank, and cutting a second slot in the second flank with the first and second slots having a common edge;

the step of forming at least one cutting insert includes the steps of forming fist and second cutting inserts, each of the cutting inserts comprises the abrasive compact bonded to the cemented carbide backing, and each of the first and second cutting inserts has a prismatic shape and includes first and second adjacent facets forming the predetermined first angle with each other, forming the first facet of each cutting insert with a cutting edge comprised of the abrasive compact, and forming the second facet of each cutting insert with a seating surface comprised predominantly of the cemented carbide backing; and the step of bonding the cutting insert in the seat of the drill body includes the steps of:

i) bonding the first cutting insert in the first slot so that the cutting edge of the first insert defines a first major cutting edge of the twist drill and the first facet of the first cutting insert coincides with the first face of the twist drill, and ii) bonding the second cutting insert into the second slot, so that the cutting edge of the second insert defines a second major cutting edge of the twist drill, the first facet of the second cutting insert coincides with the second face of the twist drill, and adjacent portions of the first and second cutting inserts form a chisel edge of the twist drill.

6. A method according to claim 2, wherein the step of cutting the strip onto the plurality of inserts includes the step of forming each of the plurality of cutting inserts with a triangular shaped seating surface.

7. A method according to claim 6, wherein:

the drill body defines an axis;

the step of forming at least one seat in the flank of the drill body includes the step of cutting the seat in the flank of the drill body in the form of a slot having a width that increases radially outward from the axis of the drill body;

the supporting surface of the seat has a generally triangular shape; and the slot includes one side coinciding with the major cutting edge of the twist drill.

8. A method according to claim 6, wherein:

the drill body comprises first and second flanks and first and second faces;

the step of forming at least one seat includes the steps of cutting a first slot in the first flank, and cutting a second slot in the second flank with the first and second slots having a common edge.

the step of forming at least one cutting insert includes the step of forming first and second cutting inserts, each of the cutting inserts comprises the abrasive compact bonded to the cemented carbide backing, each of the first and second cutting inserts has a prismatic shape and includes first and second adjacent facets forming the predetermined first angle with each other, forming the first facet of each cutting insert with a cutting edge comprised of the abrasive compact, and forming the second facet of each cutting insert with a seating surface comprised predominantly of the cemented carbide backing;

the step of bonding the insert in the seat of the drill body includes the steps of i) bonding the firs cutting insert in the first slot of the drill body, so that the cutting edge of the first cutting insert defines a first major cutting edge of the twist drill and the first facet of the first cutting insert coincides with the first face of the twist drill, and ii) bonding the second cutting insert in the second slot of the drill body, so that the cutting edge of the second cutting insert defines a second major cutting edge of the twist drill, the first facet of the second cutting insert coincides with the second ace of the twist drill, and adjacent portions of the first and second cutting inserts form a chisel edge of the twist drill.

9. A method according to claim 1, wherein:

the bonding step includes the step of inserting the cutting insert into the seat of the drill body; and further including the step of finally shaping the cutting insert after the inserting step, by grinding or electric discharging machining.

10. A method according to claim 1, wherein the forming step includes the step of forming said one insert with two end faces and a plurality of side faces, wherein each of said end faces is a polygon, said end faces are parallel to each other and have equal sizes and shapes, and each of said side faces is a parallelogram.

11. A method according to claim 10, wherein the step of forming said one insert with two end faces and a plurality of side faces includes the steps of:

forming a first of the side faces as the first facet of the insert; and forming a first of the end faces as the second facet of the insert.

* * * * *

UNITED STATES PATENT AND TRADEMARK OFFICE
CERTIFICATE OF CORRECTION

PATENT NO. : 5,195,404
DATED : March 23, 1993
INVENTOR(S) : Theo A. Notter, et al.

It is certified that error appears in the above-identified patent and that said Letters Patent is hereby corrected as shown below:

Column 4, line 22, Claim 1: "lest" should read --least--

Column 5, line 12, Claim 5: "fist" should read --first--

Column 5, line 40, Claim 6: "onto" should read --into--

Signed and Sealed this

Thirty-first Day of May, 1994

Attest:

BRUCE LEHMAN

Attesting Officer     Commissioner of Patents and Trademarks